United States Patent [19]

Heidecker et al.

[11] 3,951,264

[45] Apr. 20, 1976

[54] FLEXIBLE DISC CARTRIDGE

[75] Inventors: Robert F. Heidecker, Longmont;
Albin Kenneth Johnson, Arvada;
Galen B. Royer, Boulder, all of Colo.

[73] Assignee: Dynastor, Inc., Denver, Colo.

[22] Filed: Oct. 29, 1974

[21] Appl. No.: 518,278

[52] U.S. Cl................................ 206/444; 206/303;
206/309; 346/137; 360/99; 360/135
[51] Int. Cl.².................... B65D 85/02; G11B 5/16;
G11B 17/00
[58] Field of Search ........... 206/307, 309, 310, 312,
206/303, 444; 346/137; 360/135, 99; 312/9,
10, 11, 12

[56] References Cited
UNITED STATES PATENTS

| | | |
|---|---|---|
| 2,777,699 | 1/1957 | Woodruff.............................. 312/12 |
| 2,848,106 | 8/1958 | Rice..................................... 312/11 |
| 3,729,720 | 4/1973 | Darling................................ 346/137 |

Primary Examiner—William T. Dixson, Jr.
Attorney, Agent, or Firm—Reilly and Hancock

[57] ABSTRACT

A flexible or "floppy" disc such as is used for data storage is retained within an enclosure that substantially protects it from contaminants or damage from handling while not in use but still permits ready access to the disc by a machine. A hub nests the disc in a bore on a tray which is received by an envelope-type of housing so that a complete enclosure is provided. The flat surfaces of the housing act to retain the disc hub within the bore while in the cartridge. A latching arrangement between the tray and the housing permits either manual or machine release of the tray. The entire housing containing the tray and the disc is readily adapted to loading within a machine by means of a hub-engaging spindle to lift the disc from the tray after it has been removed from the housing. Strategically located ridges guide the disc hub into proper tray engagement when the disc is stored in the cartridge. A plurality of slots on the tray augment air flow under the disc. Various features of the tray and housing further improve proper disc and tray alignment as well as machine adaptability.

12 Claims, 5 Drawing Figures

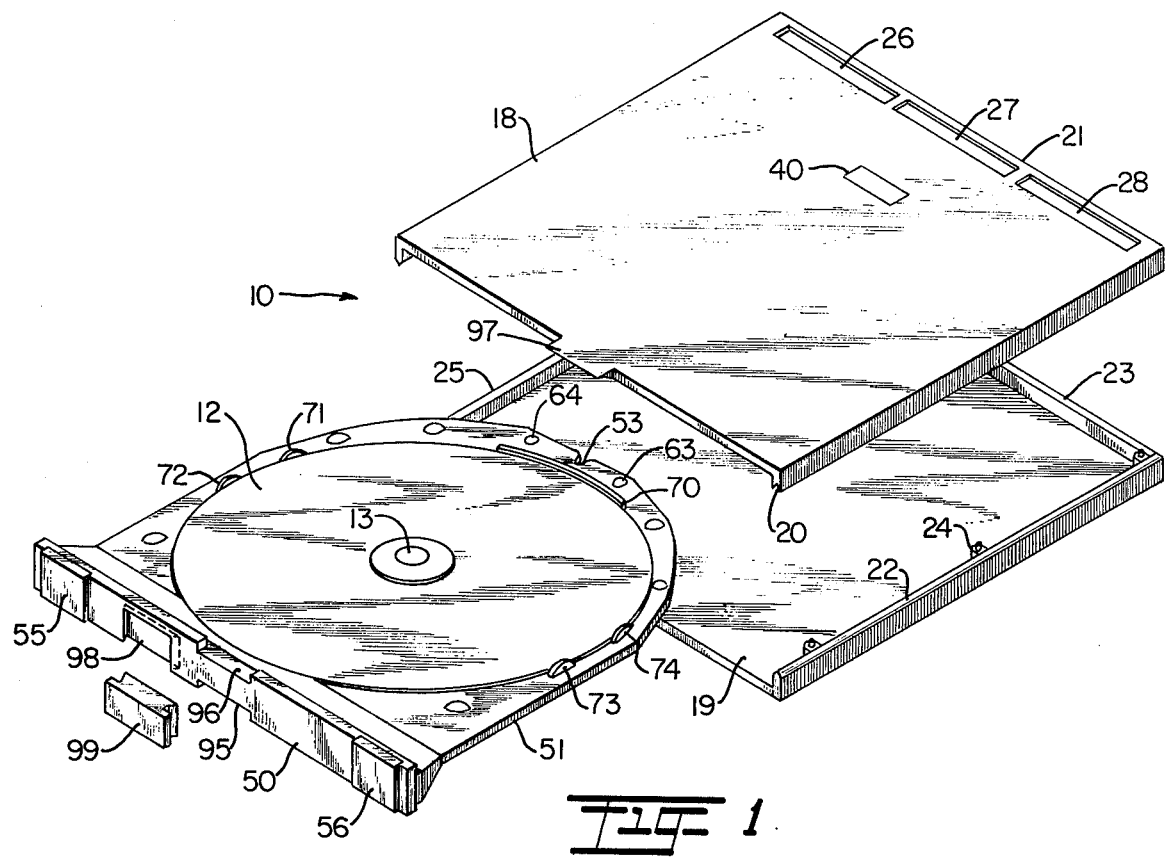
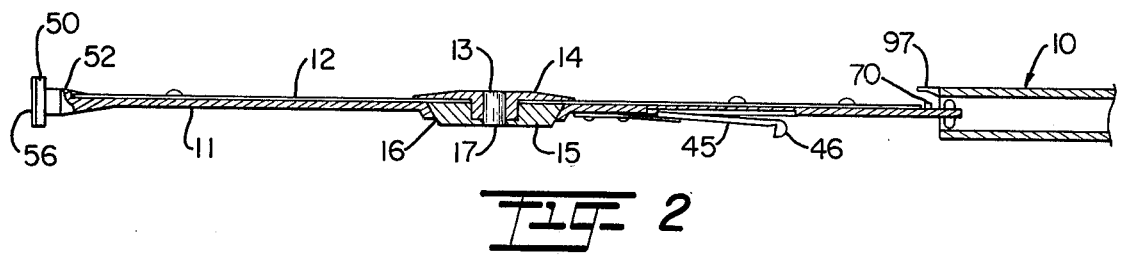
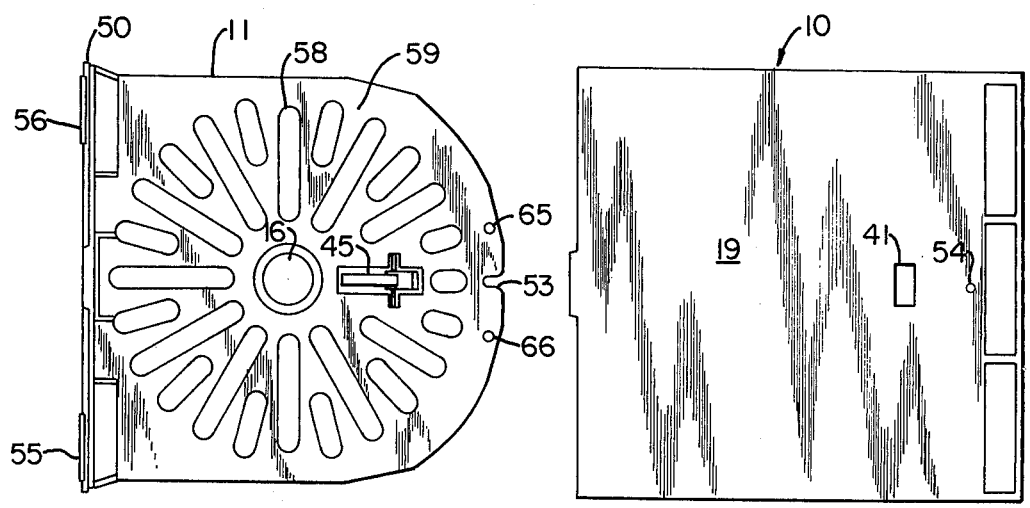

FLEXIBLE DISC CARTRIDGE

CROSS REFERENCE TO RELATED APPLICATIONS

Copending application Ser. No. 464,054 entitled FLEXIBLE DISC RECORDING APPARATUS by R. F. Heidecker et al which was filed on Apr. 25, 1974 and which is assigned to the assignee of this application is directed to apparatus associated with the machine operation in conjunction with a cartridge in accordance with this application.

BACKGROUND OF THE INVENTION

The present invention relates to cartridges for storing disc-type devices. More particularly, the present invention relates to a storage cartridge which can retain a highly flexible disc such as is used for data storage in the data processing industry in such a manner as to protect this disc from damage from ambient contamination or handling. The flexible disc storage cartridge of this invention is particularly well-suited for storing so-called floppy discs in a manner which can be easily adapted to machine removal of the disc.

The use of flexible or floppy discs has become increasingly popular as a storage medium for the data processing field. Such discs have typically been applied as data entry buffers, program loaders and even as mass memories for some computer systems, particularly minicomputers. Generally, such flexible discs are fabricated from an extremely thin sheet of plastic such as Mylar which is coated with a magnetic oxide and provided with a central opening for mounting on a drive spindle. Although such discs have no substantial rigidity, they tend to initially approach a flat plane through centrifugal force when rotated at high speeds such as 900 rpm. The disc is then maintained in a relatively fixed plane such as by spinning it in proximity to a flat plate so that Bernoulli's principle becomes effective to maintain an air bearing. These discs in the past have been mounted in a cartridge with an opening through which a head can be positioned into proximity to the disc in either a contact or non-contact arrangement relative to the recording surface for reading and/or writing information on the recording surface of the disc. Since data can be retrieved from discs with significantly greater speed than tape devices, discs have been popular for storage in many computer systems.

The development of minicomputer systems have increased the demand for lower cost mass storage. Although hard disc systems could provide such storage requirements, these systems have tended to be too costly for mini-computer applications. Prior attempts to provide flexible disc drive systems which accommodate removable disc cartridges have resulted in devices which were likewise too costly and/or unreliable for use in many applications. Even though the cost of the disc medium is modest, the mechanical features and mechanisms used to implement the technology has often been prohibitively expensive. Further, reliability suffered with the removable cartridge units due to design configurations which inadequately controlled the critical tolerances required in the non-contact technology and further inadequately protected the disc surface from particle contaminants which might cause a breakdown in the air bearing separating the head and the media. The resulting relative close contact between the head and the media is sometimes referred to in the industry as head crashes and results in damage to the media and/or the head.

There has thus been a continuing need for a flexible medium disc cartridge in a low-cost configuration which, when used with an appropriate disc drive, can operate as a data storage device in a reliable and continuous manner. Further, it is important that the disc cartridge protect the disc medium from contaminants and damage during storage, shipping or handling and that the cartridge be designed to interface with a disc drive and receiver in such a way that it can be inserted into the disc drive without exposing the medium to ambient conditions or handling.

SUMMARY OF THE INVENTION

The present invention provides a cartridge for storing flexible disc mediums in a manner which is readily adapted to machine acceptance and which is further characterized by being well-suited for construction from low-cost materials and procedures. More particularly, the present invention contemplates including a disc retaining tray which can be fully inserted within a receiving housing so as to provide a totally enclosed cartridge when not in use. A hub mounting on the flexible disc medium rests on the tray with the lower portion of this hub nesting in an enlarged hole at the center of the tray which serves to retain the disc in the cartridge. This hub is constrained to remain in the hole by the inside surface of the cartridge receiver when the cartridge is closed thereby preventing the medium from becoming wrinkled or curled and further retaining it in a predictable location for reliable machine handling. A lock arrangement retains the tray within the housing but is arranged to be released by a plunger or solenoid type of mechanism in the receiving apparatus or, if necessary, such as for replacement of the disc, by positive manual means. The tray can be extracted from the cartridge housing by release of the locking mechanism and engagement of the tray with a withdrawing apparatus in the receiver, this being effected in the preferred embodiment by magnetic means. The hub is adapted to be engaged by a clutch-type of spindle device in the receiver which then permits rotation of the disc away from the tray so that it can be used for reading and/or writing purposes. The cartridge of this invention is useful in either contact or non-contact types of disc drive systems.

A series of problems have been encountered in prior attempts to utilize flexible discs as a data storage medium. For instance, such devices tend to fold or curl easily because of their highly flexible nature. In addition, they tend to be diverted from their desired locations due to attraction from static electric charges. The present invention, in addition to using the guiding hub and matching tray bore, includes strategically located peripheral ridges on the tray which urge the disc into proper alignment when it has been released by the spindle clutch engagement. It is also highly desirable to have the disc returned to its flat storage arrangement on the tray as quickly as possible after the disc has been released from the spindle clutch. Thus, the tray of this invention includes a plurality of slots which augment the release of air from beneath the disc and expedite its return to storage relation on the tray. A wedge-shaped portion along the outer edge of the tray further augments the positioning of the hub within the housing so that it will be retained by that housing thereby further preventing accidental wrinkling of the disc medium when the cartridge is handled outside of the receiving apparatus. Other features in the cartridge and on the tray further supplement the proper alignment of the tray and the cartridge for storage.

It is an object of the present invention to provide a storage cartridge arrangement for a flexible disc.

A further object of the present invention is to provide a storage cartridge for a flexible medium which provides a substantially complete enclosure around the medium so that it is not exposed to ambient conditions or to damage from handling.

Yet another object of the present invention is to provide a cartridge arrangement for retaining a flexible disc in a manner which prevents accidental removal of the disc from the cartridge while substantially protecting the disc from ambient conditions or handling.

Still another object of the present invention is to provide a flexible disc storage cartridge which will retain the cartridge in a manner which will prevent wrinkling or curling of the flexible medium as well as protecting said medium from ambient conditions.

A still further object of the present invention is to provide a flexible disc storage cartridge which is particularly well-suited for storage of the disc medium external to a machine but which is readily adapted to automatic machine handling.

The foregoing and other objects, features and advantages of the present invention will be more readily apparent in view of the following discussion of a preferred embodiment.

BRIEF DESCRIPTION OF THE DRAWINGS

FIG. 1 is a partially exploded view of a storage cartridge in accordance with the present invention.

FIG. 2 shows the relationship of the disc medium retaining tray when removed from the cartridge housing.

FIG. 3 shows a bottom plan view of the tray and cartridge of FIG. 1.

BRIEF DESCRIPTION OF THE PREFERRED EMBODIMENT

Figure 4:
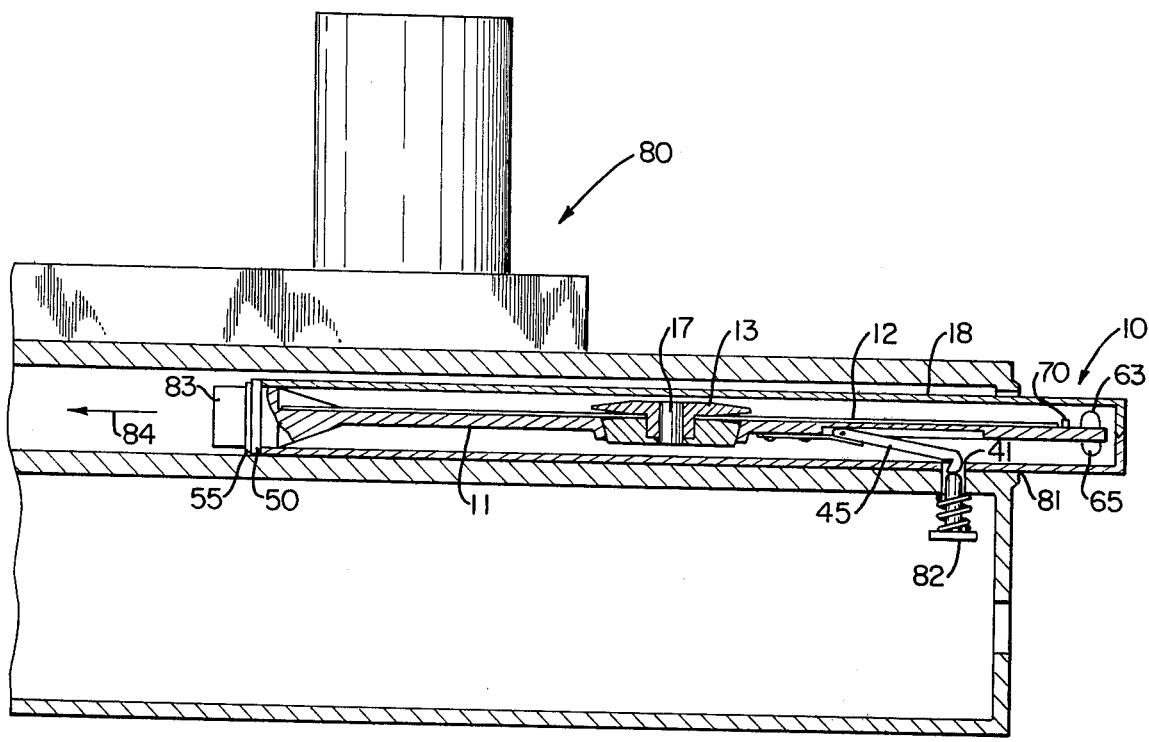
FIG. 4 illustrates an arrangement for receiving the cartridge of the present invention in a machine.

The flexible medium disc cartridge of this invention as shown in FIG. 1 includes a disc cartridge housing 10 which is formed in an envelope shape to receive cartridge tray 11 on which is resting the flexible medium disc 12 and disc hub assembly 13. Receiver housing 10 and tray 11 cooperate when tray 11 is fully inserted into housing 10 so that the two parts in combination form a substantially totally enclosed cartridge for protecting the disc medium 12 from contamination or damage.

As can best be seen in FIG. 2, the flexible disc medium 12 and hub assembly 13 which is comprised of upper portion 14 and lower portion 15 form the disc assembly. The disc assembly is constrained to remain generally centered on the tray 11 primarily by lower hub portion 15 which has a conical or beveled edge to nest in the central hole 16 on tray 11 with hole 16 having a mating conical or beveled inner surface. Envelope housing 10 as shown in FIG. 1 is preferably fabricated from two identical molded plastic parts 18 and 19 each of which form one-half of the receiver envelope 10 with 18 providing the upper surface and 19 providing the lower surface thereof. Sections 18 and 19 are designed to mate together by means of a slot such as 20 formed along one edge and half of the back 21 of upper portion 18 which matches with a tongue assembly 22 which extends half-way around the back 23 of section 19. In addition, pins such as 24 on 19 match with receiving sockets on 18 [not shown] while receiving slots on the far side 25 of 18 will accept pins which are also not shown on the underside of 18.

It is also preferable to mold 18 and 19 with a slot such as 40 which can be removed to accept a locking mechanism as will be more apparent from the later description. Further, a series of depressions 26–28 are molded into the far edge of each section for accepting name plates and other identification data.

The slot 41 in lower section 19 typically is removed to accept locking mechanism 45, this best being seen in FIGS. 2, 3 and 4. Locking mechanism 45 is a spring-loaded arm which has a rounded tip 46 to facilitate entry of the lock arrangement 45 into the envelope housing 10. Any means of biasing 45 away from tray 11 can be used although a relatively simple spring clip has been found to be satisfactory.

The tray assembly 11 is composed of an elongated outer edge 50 to which is attached flat plate 51 in perpendicular relation, edge 50 and plate 51 typically being formed of plastic as one piece. Elongated outer edge 50 of tray 11 completes the enclosure of the open end of the envelope housing 10. In addition, edge 50 as shown contains two attached steel cartridge clips 55 and 56 which are for the purpose of cooperating with magnet means in the receiver for removing the tray from housing 10 as will be discussed later. As mentioned, the tray lock hardware is preferably mounted on the lower surface of tray 11 and consists of tray lock hooks 45 which engages the tray lock slot 41 in the lower half 19 of receiver envelope 10.

Elongated slots or holes such as 58 as shown in FIG. 3 in the tray surface are for the purpose of minimizing the tray surface area seen by disc 12 to alleviate the possibility of the disc medium adhering to the tray when rotation of disc 12 is started. In addition, the remaining surface area 59 is preferably textured or roughened to prevent all the air from being evacuated from between tray 11 and disc 12 again to prevent adhesion between the tray and medium. Further, slots 58 will augment the return of disc 12 to the tray by providing a means for air escape from under the disc as will be discussed later.

The leading edge of tray 11 is supported within the cartridge receiver housing 10 by tray-bearing pads 63 and 64 on the upper surface and 65 and 66 on the lower surface. In addition, ridge 70 and nubs 71–74 aid in centering the disc 12 on the tray as hub 13 is returned from its operating position to the storage or resting position.

The flexible medium from which disc 12 is made is preferably similar to standard computer tape which is an extremely thin sheet of plastic such as Mylar. This plastic is coated on one or both sides with a basically thin coating of magnetic oxide suitable for electromagnetic reading and writing of information. Typically the thickness of the medium is 1.5 milli-inches while the coating thickness is typically 110 micro-inches. Disc 12 is stamped or cut from a larger piece of medium and a central hole is stamped in the disc to mate with the hub 13. Although not shown, the central hole in disc 12 would typically have three notches equally spaced around the circumference which mate with the disc hub 13 to prevent the medium of disc 12 from slipping relative to hub 13. It should be further noted that the shapes of upper disc hub portion 14 and lower disc hub portion 15 are slightly tapered such that, when the medium is supported entirely by the hub 13 or when it is spinning about hub 13, the medium will not be creased or stressed. As is best seen in the section view of FIG. 2, upper hub portion 14 is also formed with downward sloping outer edges to prevent its catching on the outer edge of the opening of housing 10 when tray 11 is inserted therein. Tap 97 is likewise sloped to further reduce the possibility of catching 14 and also to engage notch 96.

FIG. 4, although primarily showing the interrelationship between a disc cartridge 10 and a typical receiving apparatus 80 for which the cartridge thus far described is particularly well suited, also best illustrates the arrangement of hub 13 which is dimensioned so that the spacing between it and upper surface 18 of cartridge 10 will prevent disc 12 from migrating within cartridge 10. Such an event could result in the disc being displaced within the cartridge and also potentially creased or stressed during handling of cartridge 10. Note also from FIG. 2 that the flat plate portion 51 of tray 11 has a substantially wedge-shaped portion 52 at its point of juncture with the elongated outer edge 50. This further insures proper centering of tray 11 within envelope 10 and location of hub 13 in sufficient proximity to upper surface 18 to insure that it will not disengage from bore 16 in plate 51 during storage. Still further, the leading edge of tray 11 as shown in FIGS. 1 and 3 has a V-shaped slot 53 which will cooperate with pin 54 formed by nubs in upper surface 18 and lower surface 19 to insure that plate 11 is properly centered when it is inserted into envelope 10 thereby further insuring that lock spring 45 will properly engage slot 41.

Figure 5:
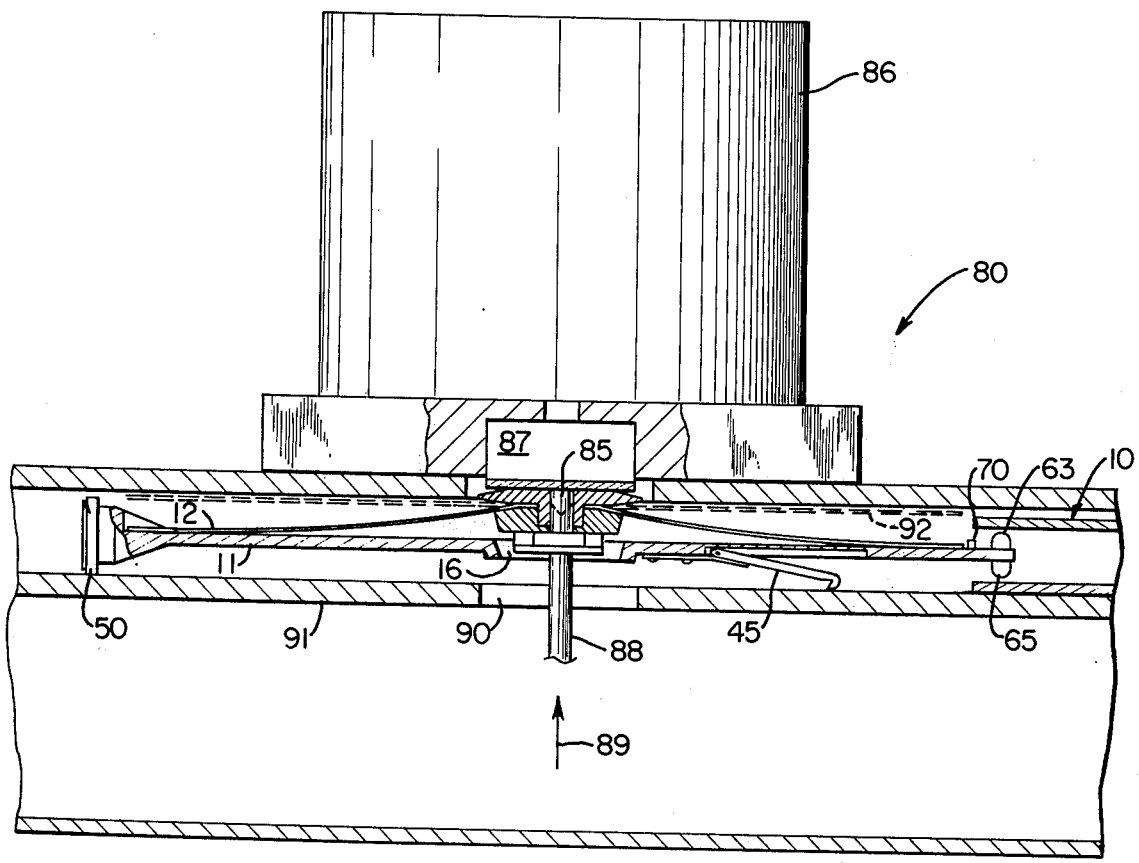
FIG. 5 shows the disc when loaded onto a spindle in the receiving machine after the tray has been automatically removed from the cartridge.

By way of example, FIGS. 4 and 5 show a potential interrelationship of the cartridge of this invention with respect to a receiving apparatus 80. The cartridge 10 is loaded into this disc drive 80 by first inserting the closed and locked cartridge 10 into slot 81 of disc drive 80. FIG. 4 shows the cartridge when initially located in drive 80 and FIG. 5 shows the cartridge as unloaded by the drive 80. With the cartridge 10 fully inserted into the drive receiver 80 as shown in FIG. 4, the slot 41 in the envelope 10 is positioned above plunger 82 in disc drive receiver 80 which along with suitable actuation means will serve to unlock the tray 11 from the cartridge envelope 10. With cartridge 10 in the position shown in FIG. 4, the steel clips 55 and 56 in the elongated outer edge 50 of tray 11 are brought into engagement with magnet means such as 83 which are attached to suitable apparatus for pulling tray 11 in the direction indicated by arrow 84.

To extract tray 11 from envelope housing 10, actuation means are first applied to raise plunger 82 against the tray lock hook 45 thereby displacing hook 45 upward until it is completely disengaged from tray lock slot 41. When the hook 45 is thus disengaged, plunger 82 is protruding through tray lock slot 41 and thus retains envelope housing 10 in place. The release of lock 45 by plunger 82 then can permit movement of tray 11 in the direction of arrow 84 by an actuating mechanism such as might be attached to magnet means 83.

Tray 11 is extracted to the extent shown in FIG. 5 which positions tray-bearing pads 63 and 65 near the edge of the cartridge housing 10. In addition, the disc hub 13 has been moved until it is under spindle 85 which may be the shaft of an AC motor 86 and spindle drive hub 87. When disc hub 13 is positioned directly under spindle 85, lower spindle 88 is moved upward as indicated by arrow 89, thus raising disc hub 13 so as to cause spindle 85 to enter hole 17 and mate with the upper surface of spindle 88 as is shown in FIG. 5. Lower spindle 88 typically is bearing mounted to follow the rotation of spindle 85 and the disc 12. The force applied upward from spindle 88 as shown at 89 is continuously maintained during rotational operation of the drive spindle to hold constant the frictional interface between spindle drive hub 85 and lower spindle 88.

As shown in FIG. 5, the central hole 16 in tray 11 and a similar hole 90 in the upper receiver plate 91 provide access for the lower spindle assembly 88 to interface and raise the disc hub 13 to registration on the drive spindle 85. With disc hub 13 in full contact with the spindle drive hub 85 and 88 but in the absence of any rotational motion, disc 12 will sag downward from the drive spindle location to contact the surface of tray 11 as shown in FIG. 5. When rotation is imparted to spindles 85 and 88 and thus to hub 13, disc 12 will rise into its plane of rotation as generally indicated at 92. Upon termination of rotational motion, disc 12 again droops so that its outer periphery is in contact with the surface of tray 11. When spindle 88 is withdrawn allowing disc hub 13 to drop towards its nesting position in bore 16 of tray 11, the media with the aid of the disc centering pads and ridges as shown in 70–74 in FIG. 1 will cause disc 12 to be positioned so that the hub will properly seat in central hole 16 of tray 11. The tray is returned to the cartridge receiver housing 10 by reversing the force applied to magnet means 83 in a direction opposite to arrow 84 which causes the tray to slide back into the envelope housing 10 as shown in FIG. 4. To complete the cartridge closing operation, the means for holding plunger 82 protruding through tray lock slot 41 is reversed thereby causing plunger 82 to retract from slot 41 unlocking the cartridge from the disc drive receiver 80 but at the same time allowing tray lock hook 45 through interaction with its spring biasing to again lock tray 11 in envelope cartridge receiver housing 10. Upon completion of this operation, cartridge 10 can be removed from receiver 80. Note that the relief of pressure from under disc 12 via ports or slots 58, the textured surfaces 59 on tray 11, the guiding action of nubs or ridges 70–74 and the beveled interaction between hubs 13 and bore 16 all expedite the return of disc 12 to a correctly positioned flat orientation on tray 11 so that it can be quickly reinserted into envelope 10. Such interactions are significant in that they prevent any dislocation of disc 12 which could result in its being scraped or crushed as tray 11 is being returned into envelope receiver 10.

Returning again to FIG. 1, elongated outer edge 50 has two slots 95 and 96 which are sloped towards plate 51 to engage tabs on the outer edge of 10 such as 97. Further, a slot 98 can be included to accept an insert such as 99 which could be useful for providing a so-called write protect feature. That is, the absence of 99 from slot 98 could be interpreted by receiver disc drive 80 as indicating that data can not be written on disc 12 whereas the presence of insert 99 can indicate that such writing is allowed or vice versa.

Although the preferred embodiment of this invention has been discussed hereinbefore in considerable detail, it will be readily understood by those having normal skill in the art that various modifications, changes and additions can be made without departing from the spirit of this invention.

What is claimed is:

1. Apparatus for retaining a flexible disc comprising:
    a tray having an elongated outer edge and a flat plate perpendicular to said outer edge with a bore extending at least partially thereinto from the upper surface of said flat plate,
    a hub centrally mounted on said disc adapted for nesting engagement in said bore, and
    a housing for slidably receiving said tray and having upper and lower internal surfaces spaced for retaining said hub in said bore whenever said tray is inserted in said housing, said outer edge of said tray providing a complete enclosure of said tray in cooperation with said housing whenever said tray is inserted in said housing.

2. Apparatus in accordance with claim 1 wherein said flat plate of said tray has a substantially wedge-shaped portion in proximity to said outer edge for urging said hub towards the upper surface of said housing whenever said tray is inserted therein.

3. Apparatus in accordance with claim 1 wherein one of said housing surfaces has an internal slot therein, said tray having latch means mounted thereon for engaging said slot for locking said tray within said housing.

4. Apparatus in accordance with claim 1 wherein said housing has at least one pin extending between the surfaces thereof at a point opposite the portions of the enclosure which is completed by the said outer edge of said tray, said tray having at least one substantially V-shaped slot on the edge of said plate opposite said elongated outer edge for engaging said pin and urging said tray into enclosure completing alignment.

5. Apparatus for removably retaining a flexible disc comprising:
    a tray having an elongated outer edge and a flat plate extending perpendicular to said outer edge, said plate having a central bore and raised ridge portions located relative to said bore for engaging the outer peripheral meter of the disc,
    means on said elongated outer edge of said tray on the side thereof opposite to said flat plate for permitting machine removal of said tray from said housing,
    a hub centrally mounted on the disc for nesting engagement with said bore, and
    a housing arranged for slidably receiving said tray thereinto and for cooperatively engaging with said elongated outer edge of said tray for providing a complete enclosure for said tray, said housing having upper and lower surfaces spaced for retaining said hub in said bore whenever said tray is inserted in said housing.

6. Apparatus in accordance with claim 5 wherein said tray includes a plurality of slots extending through said flat plate between said bore and said raised ridge portions.

7. Apparatus in accordance with claim 6 wherein said housing has a slot in one of the said surfaces thereof, and said tray has a latch means mounted thereon for engaging said slot whereby said tray is locked into said housing.

8. Apparatus in accordance with claim 2 wherein said latch means is an outwardly biased catch means mounted on the surface of said tray opposite the surface that said hub nests into said bore.

9. Apparatus in accordance with claim 5 which further includes:
    a pin between said upper and lower surfaces of said housing, said pin being located internal to said housing on the side opposite the side which cooperates with the elongated edge of said tray,
    said tray having a substantially V-shaped notch along the edge of said flat plate opposite said elongated edge for engaging said pin whereby said tray is urged into enclosure completing alignment when inserted into said housing.

10. Apparatus in accordance with claim 5 which further includes means on said elongated outer edge of said tray for indicating whether or not information can be written onto the disc retained on said tray.

11. Apparatus in accordance with claim 5 wherein said flat plate of said tray has a wedge-shaped portion where it joins said elongated outer edge for urging said hub towards said upper surface of said housing when said tray is inserted into said housing.

12. Apparatus in accordance with claim 5 wherein said bore has conically shaped sloping sides, and said hub has an upper portion and a lower portion relative to said disc, said lower portion having conically sloped sides for fitting within said bore, said upper portion being dimensioned to engage said upper surface of said housing for holding said lower portion in said bore whenever said tray is inserted in said housing.

* * * * *

UNITED STATES PATENT OFFICE
CERTIFICATE OF CORRECTION

Patent No. 3,951,264　　　　　　　Dated July 9, 1976

Inventor(s) Robert F. Heidecker et al

It is certified that error appears in the above-identified patent and that said Letters Patent are hereby corrected as shown below:

Column 1, line 49, cancel "have" and substitute --has--.

Column 6, line 33, cancel "in" (1st occurrence) and substitute --at--.

Column 8, line 19, cancel "2" and substitute --7--.

Column 7, line 47, cancel "peripheral meter" and substitute --perimeter--.

Signed and Sealed this

Fourteenth Day of September 1976

[SEAL]

Attest:

RUTH C. MASON
Attesting Officer

C. MARSHALL DANN
Commissioner of Patents and Trademarks